(12) United States Patent
Fujisawa et al.

(10) Patent No.: US 11,339,531 B2
(45) Date of Patent: May 24, 2022

(54) DYED LEATHER-LIKE SHEET AND FIBER STRUCTURE

(71) Applicant: KURARAY CO., LTD., Kurashiki (JP)

(72) Inventors: Michinori Fujisawa, Okayama (JP); Tetsuya Ando, Osaka (JP); Hiroyuki Hishida, Okayama (JP); Yasunori Murate, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 280 days.

(21) Appl. No.: 16/464,885

(22) PCT Filed: Nov. 13, 2017

(86) PCT No.: PCT/JP2017/040799
§ 371 (c)(1),
(2) Date: May 29, 2019

(87) PCT Pub. No.: WO2018/101016
PCT Pub. Date: Jun. 7, 2018

(65) Prior Publication Data
US 2019/0323173 A1     Oct. 24, 2019

(30) Foreign Application Priority Data

Nov. 30, 2016 (JP) .............................. JP2016-232641
May 31, 2017 (JP) .............................. JP2017-108178

(51) Int. Cl.
*D06P 1/42*     (2006.01)
*C09B 19/00*    (2006.01)
(Continued)

(52) U.S. Cl.
CPC ................ *D06P 1/42* (2013.01); *C09B 19/00* (2013.01); *D06N 3/00* (2013.01); *D06N 3/0004* (2013.01);
(Continued)

(58) Field of Classification Search
CPC .... D06P 1/08; D06P 1/42; D06P 3/522; D06P 3/527; D06P 3/56; D06N 3/0036; D06N 3/0004; D06N 3/0065; D06N 2209/0823
See application file for complete search history.

(56) References Cited

U.S. PATENT DOCUMENTS 3,442,859 A  *  5/1969  Stanley ..................... C14C 3/20
                                                          525/500
3,948,598 A     4/1976  Okaniwa et al.
(Continued)

FOREIGN PATENT DOCUMENTS

CN          1511897 A  *  7/2004
CN        101768257 B      8/2012
(Continued)

OTHER PUBLICATIONS

National Center for Biotechnology Information. "PubChem Compound Summary for CID 118408, C.I. Basic Blue 3" PubChem, https://pubchem.ncbi.nlm.nih.gov/compound/C.I.-Basic-Blue-3. Accessed May 3, 2021.*
(Continued)

*Primary Examiner* — Larissa Rowe Emrich
(74) *Attorney, Agent, or Firm* — Grüneberg and Myers PLLC (57) ABSTRACT

Disclosed is a leather-like sheet having a lightness L* of 35 or less, and including a fiber structure including fiber dyed with a dye composition including C.I. Basic Blue 3 and at least one blue cationic dye other than C.I. Basic Blue 3, and an elastic polymer contained in internal voids of the fiber structure, or the fiber structure. Also disclosed is a leather-like sheet having a lightness L* of 35 or less, and including a fiber structure including fiber dyed with an azo-based blue cationic dye, and an elastic polymer contained in internal voids of the fiber structure, wherein the leather-like sheet or the fiber structure has a color difference (ΔE), determined (Continued)

when treated for 48 hours under moist and hot conditions of 80° C. and a moisture of 90%, of $\Delta E \leq 2$. or the fiber structure.

6 Claims, 8 Drawing Sheets

(51) Int. Cl.
  *D06N 3/00* (2006.01)
  *D06P 3/52* (2006.01)
(52) U.S. Cl.
  CPC ......... *D06N 3/0036* (2013.01); *D06N 3/0065* (2013.01); *D06N 2209/0823* (2013.01); *D06P 3/522* (2013.01); *D10B 2331/04* (2013.01)

(56) References Cited

U.S. PATENT DOCUMENTS

| | | | |
|---|---|---|---|
| 4,116,622 A | | 9/1978 | Koller et al. |
| 4,421,519 A | * | 12/1983 | Loew ................ C09B 67/0033 8/534 |
| 4,557,972 A | * | 12/1985 | Okamoto ............. D04H 1/4382 428/373 |
| 4,604,320 A | | 8/1986 | Okamoto et al. |
| 6,180,225 B1 | * | 1/2001 | Nikkeshi .................. C08K 9/12 428/331 |
| 2011/0070422 A1 | * | 3/2011 | Ammirati ............... D06N 3/147 428/297.4 |
| 2012/0058166 A1 | * | 3/2012 | Glenn, Jr. ................. D04H 3/16 424/401 |
| 2018/0066397 A1 | | 3/2018 | Murate et al. |
| 2020/0048828 A1 | | 2/2020 | Fujisawa et al. |

FOREIGN PATENT DOCUMENTS

| | | |
|---|---|---|
| CN | 103397545 A | 11/2013 |
| EP | 2 011 840 A1 | 1/2009 |
| GB | 2 001 092 | 1/1979 |
| JP | S50-145680 | 11/1975 |
| JP | S52-12389 | 1/1977 |
| JP | S57-212261 | 12/1982 |
| JP | 61-146890 A | 7/1986 |
| JP | H08-209551 A * | 8/1996 |
| JP | H10-8384 | 1/1998 |
| JP | 10-251981 A | 9/1998 |
| JP | 2005-120538 A | 5/2005 |
| JP | 2006-152461 A | 6/2006 |
| JP | 2007-291148 A | 11/2007 |
| JP | 2009-74197 A | 4/2009 |
| JP | 2013-209776 A | 10/2013 |
| WO | WO 2016/147671 A1 | 9/2016 |

OTHER PUBLICATIONS

B. Karagozoglu, et al., The adsorption of basic dye (Astrazon Blue FGRL) from aqueous solutions onto sepiolite, fly ash and apricot shell activated carbon: Kinetic and equilibrium studies, Journal of Hazardous Materials, vol. 147, Issues 1-2, 2007, pp. 297-306, ISSN 0304-3894. (Year: 2007).*
"CN1511897_Machine Translation" is a machine translation of CN-1511897-A. (Year: 2004).*
"JPH08209551_Machine Translation" is a machine translation of JP-H08-209551-A. (Year: 1996).*
"Basic Blue 66." Basic Blue 66 | 12221-38-4, Chemical Book, www.chemicalbook.com/ChemicalProductProperty_EN_CB9911675. htm.*
International Search Report dated Feb. 6, 2018 in PCT/JP2017/040799 dated Nov. 13, 2017.
Supplementary European Search Report dated Jul. 2, 2020 in European Application No. 17876256.3.
Extended European Search Report dated Mar. 17, 2021 in European Application No. 18809878.4, 9 pages.

* cited by examiner

DYED LEATHER-LIKE SHEET AND FIBER STRUCTURE

TECHNICAL FIELD

The present invention relates to a leather-like sheet dyed with a blue cationic dye, and a fiber structure.

BACKGROUND ART

As a fiber structure included in a leather-like sheet such as an artificial leather, a non-woven fabric of polyester fibers is preferably used because of the excellent heat resistance and moldability. As dyes for dying polyester fibers, disperse dyes have been conventionally widely used because of the excellent color development. However, disperse dyes have the problem that they tend to migrate under heat or pressure, or in the presence of a solvent. To solve such a problem, an attempt also has been made to dye cationic dyeable fibers with a cationic dye.

For example, PTL 1 below discloses a napped artificial leather dyed with a cationic dye, including: a non-woven fabric of cationic dyeable fibers having a fineness of 0.07 to 0.9 dtex; and an elastic polymer provided inside the non-woven fabric, wherein the napped artificial leather has L* value of ≤50, a grade of color difference, determined in an evaluation of color migration to PVC under a load of 0.75 kg/cm at 50° C. for 16 hours, of 4 or more, a tear strength per mm of thickness of 30 N or more, and a peel strength of 3 kg/cm or more.

Meanwhile, a fiber structure dyed with a blue cationic dye, which is one of cationic dyes, has disadvantages. Specifically, a blue cationic dye has disadvantages such as not being able to easily develop a bright blue color, having a low lightfastness, thus making it difficult to achieve both color development of bright blue and a high lightfastness. Additionally, ultrafine fibers having a low fineness have a disadvantage that they cannot be dyed in a dark color unless a large amount of a blue cationic dye is exhausted, in which case the color of the ultrafine fibers tends to fade.

As the blue cationic dye, for example, PTL 2 below describes C.I. Basic Blue 3, which is an oxazine-based blue cationic dye, and C.I. Basic Blue 54, which is an azo-based blue cationic dye, as examples of the dye for dying aromatic polyamide fibers.

Although not a technique relating to a leather-like sheet, PTL 3 below discloses an ozone detection ink composition containing an oxazine-based dye, which is a cationic dye, and a cationic surfactant, and not containing a colorant (excluding, the oxazine-based dye) that is discolored with ozone, as an indicator capable of highly accurately detecting ozone even under a high-concentration ozone gas atmosphere or a high-concentration ozone gas atmosphere containing water vapor. PTL 3 discloses C.I. Basic Blue 3, C.I. Basic Blue 12, C.I. Basic Blue 6, C.I. Basic Blue 10, and C.I. Basic Blue 96.

CITATION LIST

Patent Literatures

[PTL 1] WO 2016/147671 pamphlet
[PTL 2] Japanese Laid-Open Patent Publication No. 2013-209776
[PTL 3] Japanese Laid-Open Patent Publication No. 2007-291148

SUMMARY OF INVENTION

Technical Problem

With a leather-like sheet or a fiber structure dyed into a dark color with a blue cationic dye, it is difficult to achieve both color development of bright blue and a high lightfastness.

The blue color developed by C.I. Basic Blue 3 is not bright. On the other hand, among blue cationic dyes, a blue cationic dye having an azo bond (azo-based blue cationic dye), such as C.I. Basic Blue 54, exhibits color development of bright blue. However, the azo-based blue cationic dye is disadvantageous in that it is discolored through hydrolysis under an environment with high temperature and humidity, and gradually becomes reddish. For this reason, for example, when stored for a long period in a transport container, a warehouse, or the like in which the temperature and the humidity become high, a leather-like sheet or a fiber structure dyed with an azo-based blue cationic dye undergoes discoloration. Accordingly, there is room for improvement in moist heat discoloration resistance for a leather-like sheet and a fiber structure that are dyed with an azo-based blue cationic dye.

The present invention provides a leather-like sheet and a fiber structure that are well-balanced in color development of bright blue and a high lightfastness for a leather-like sheet or a fiber structure dyed with a blue cationic dye. The present invention also provides a leather-like sheet and a fiber structure that have excellent moist heat discoloration resistance for a fiber structure or an artificial leather that is dyed with an azo-based blue cationic dye.

Solution to Problem

An aspect of the present invention is directed to a leather-like sheet having a lightness L* of 35 or less in a color coordinate space (L*a*b* color space), and including: a fiber structure including fibers dyed with a dye composition including C.I. Basic Blue 3, which is an oxazine-based blue cationic dye, and at least one blue cationic dye other than C.I. Basic Blue 3; and an elastic polymer contained in internal voids of the fiber structure, or the fiber structure. Blue cationic dyes other than C.I. Basic Blue 3 fade over time under light. On the other hand, C.I. Basic Blue 3 produces a new blue color over time under light. Therefore, a leather-like sheet or a fiber structure dyed with a combination of C.I. Basic Blue 3 and a blue cationic dye other than C.I. Basic Blue 3 undergoes less fading of the bluishness of the blue cationic dye over time. This makes it possible to obtain a leather-like sheet or a fiber structure that is well-balanced in color development of bright blue and a high lightfastness.

Preferably, C.I. Basic Blue 3 is contained in an amount of 30 to 70 mass % relative to a total amount of C.I. Basic Blue 3 and the at least one blue cationic dye other than C.I. Basic Blue 3. When the content ratio of C.I. Basic Blue 3 is too high, it is difficult to achieve bright bluishness. When the content ratio of C.I. Basic Blue 3 is too low, it is difficult to improve the lightfastness of the blue cationic dyes as a whole.

Examples of the blue cationic dye that can be used in combination with C.I. Basic Blue 3 include azo-based blue cationic dyes such as C.I. Basic Blue 159 and C.I. Basic Blue 54, and oxazine-based blue cationic dyes such as C.I. Basic Blue 75. Although these dyes are preferable in that a bright blue color can be easily developed, they tend to fade under light. By using C.I. Basic Blue 3, which initially lacks brightness, but gradually develops a new blue color over time, in combination with Basic Blue 159, C.I. Basic Blue 54, or C.I. Basic Blue 75, which fade under light, it is possible to improve the lightfastness of the blue cationic dyes as a whole.

From the viewpoint of achieving a remarkable effect, it is preferable that the total exhaustion percentage of C.I. Basic Blue 3 and at least one blue cationic dye other than C.I. Basic Blue 3 relative to the fiber structure is 0.5 mass % or more.

From the viewpoint of achieving a remarkable effect of improving the lightfastness of the blue cationic dyes as a whole, it is also preferable that the fiber structure includes ultrafine fibers of a cationic dyeable polyester having a fineness of 0.5 dtex or less.

Another aspect of the present invention is directed to a leather-like sheet having a lightness L* of 35 or less in a color coordinate space (L*a*b* color space), and including: a fiber structure including fibers dyed with an azo-based blue cationic dye such as C.I. Basic Blue 159 or C.I. Basic Blue 54; and an elastic polymer contained in internal voids of the fiber structure, wherein the leather-like sheet has a color difference (ΔE), determined when treated for 48 hours under moist and hot conditions of 80° C. and a humidity of 90%, of ΔE≤2. Another aspect of the present invention is directed to a fiber structure having a lightness L* of 35 or less in a color coordinate space (L*a*b* color space), and including fibers dyed with an azo-based blue cationic dye, wherein the fiber structure has a color difference (ΔE), determined when treated for 48 hours under moist and hot conditions of 80° C. and a humidity of 90%, of ΔE≤2.

It is preferable that the above-described leather-like sheet or fiber structure has a lightness L* of 35 or less in the color coordinate space (L*a*b* color space), and an anionic polyhydric phenol derivative is applied to a leather-like sheet or a fiber structure that includes fibers dyed with an azo-based blue cationic dye. The present inventors have found that the moist heat discoloration resistance can be improved by applying, to a leather-like sheet or a fiber structure including fibers dyed with an azo-based blue cationic dye, an anionic polyhydric phenol derivative in an amount of preferably 70% to 200%, more preferably 70 to 150%, relative to the amount of the dye attached.

Advantageous Effects of Invention

According to the present invention, it is possible to provide a leather-like sheet or a fiber structure that is dyed with a blue cationic dye, and is well-balanced in color development of bright blue and a high lightfastness. It is also possible to provide a leather-like sheet or a fiber structure that is dyed with an azo-based blue cationic dye, and has an excellent moist heat discoloration resistance.

DESCRIPTION OF EMBODIMENTS

Hereinafter, preferred embodiments of the present invention will be described specifically.

Examples of the fiber structure include a non-woven fabric, a woven fabric, and a knitted fabric including fibers having cationic dyeability (cationic dyeable fibers). Among these, a non-woven fabric including cationic dyeable fibers, in particular, a non-woven fabric of ultrafine fibers of cationic dyeable fibers, are preferable.

Examples of the cationic dyeable fibers include polyester fibers and acrylonitrile fibers that contain a monomer component having cationic dyeability as a copolymer unit. Specific examples of the monomer component for imparting cationic dyeability include: alkali metal salts (lithium salt, sodium salt, potassium salt, rubidium salt, and cesium salt) of 5-sulfoisophthalic acid; 5-tetraalkyl phosphonium sulfoisophthalic acid such as 5-tetrabutyl phosphonium sulfoisophthalic acid and 5-ethyl tributyl phosphonium sulfoisophthalic acid; 5-tetraalkyl ammonium sulfoisophthalic acid such as 5-tetrabutyl ammonium sulfoisophthalic acid and 5-ethyl tributyl ammonium sulfoisophthalic acid; and a tetraalkyl phosphonium salt of 3,5-dicarboxy benzenesulfonic acid. These may be used alone or in a combination of two or more.

The fineness of the cationic dyeable fibers is not particularly limited, and it is possible to use, for example, regular fibers having a fineness exceeding 1 dtex, or ultrafine fibers having a fineness of 1 dtex or less. In particular, because of excellent dye fastness, it is preferable to use fibers having a fineness of preferably 0.05 dtex or more, more preferably 0.07 dtex or more, and preferably 4 dtex or less, more preferably 1 dtex or less, particularly preferably 0.5 dtex or less. If necessary, a colorant such as carbon black, a light resisting agent, an antifungal agent, and the like may be added to the cationic dyeable fibers, so long as the effects of the present invention are not impaired.

A leather-like sheet such as an artificial leather or a synthetic leather can be obtained by impregnating, into the voids of the fiber structure including the cationic dyeable fibers, an elastic polymer such as a polyurethane, an acrylonitrile elastomer, an olefin elastomer, a polyester elastomer, a polyamide elastomer, or an acrylic elastomer. For the artificial leather, the ratio of the elastic polymer contained in the artificial leather is not particularly limited, and is preferably about 1 to 50 mass %. Such an artificial leather can be preferably used as a nap-finished artificial leather whose surface has been napped.

Specific examples of a blue cationic dye for dying the fiber structure including the cationic dyeable fibers include: oxazine-based blue cationic dyes such as C.I. Basic Blue 3, C.I. Basic Blue 6, C.I. Basic Blue 10, C.I. Basic Blue 12, C.I. Basic Blue 75, and C.I. Basic Blue 96; and azo-based blue cationic dyes such as C.I. Basic Blue 54 and C.I. Basic Blue 159. Note that "blue cationic dye" means a cationic dye including "C.I. Basic Blue" in the color index name (C.I.).

The dye composition for dying the cationic dyeable fibers may include a cationic dye other than the blue cationic dye. Examples of the cationic dye other than the blue cationic dye include C.I. Basic Yellow 40, which is a coumarin-based yellow cationic dye, C.I. Basic Yellow 21, which is a methine-based yellow cationic dye, C.I. Basic Yellow 28, which is an azomethine-based yellow cationic dye, C.I. Basic Red 29 and C.I. Basic Red 46, which are azo-based red cationic dyes, and C.I. Basic Violet 11, which is a xanthene-based violet cationic dye.

As a first embodiment, a leather-like sheet or a fiber structure is obtained by being dyed with a dye composition including C.I. Basic Blue 3 and at least one blue cationic dye other than C.I. Basic Blue 3, into a dark color having a lightness L* of 35 or less in a color coordinate space (L*a*b* color space).

The present inventors evaluated the lightfastnesses of many blue cationic dyes. Then, it has been confirmed that a leather-like sheet or a fiber structure dyed only with C.I. Basic Blue 3, which lacks brightness, has the property of being discolored from a light color to a dark color in a QUV accelerated weathering test. Then, as a result of analyzing this phenomenon by spectroscopic measurement, it has been confirmed that C.I. Basic Blue 3 exhibited a unique spectral change that is different from those of other commonly used blue cationic dyes. Specifically, in the QUV accelerated weathering test, a leather-like sheet or a fiber structure dyed with a commonly used blue cationic dye exhibits no change in the absorbance near 450 to 500 nm, which represent blue to green, and exhibits a decrease in the absorbance near 500 to 750 nm, which represent green to red. On the other hand, a leather-like sheet or a fiber structure dyed with C.I. Basic Blue 3 exhibits a decrease in the absorbance at 500 to 750 nm, which represent green to red, but exhibits an increase in the absorbance near 450 to 500 nm, which represent blue to green. That is, it has been confirmed that the leather-like sheet or fiber structure dyed with C.I. Basic Blue 3 produces a new blue color and is darkened in color after the QUV accelerated weathering test. Then, the inventors have found that, in the case of dyeing fibers with a plurality of blue cationic dyes to which C.I. Basic Blue 3 is added, other blue cationic dyes faded, whereas C.I. Basic Blue 3 produces a new blue color, thus achieving the effect of suppressing the fading of the blue color as a whole.

Figure 1A:
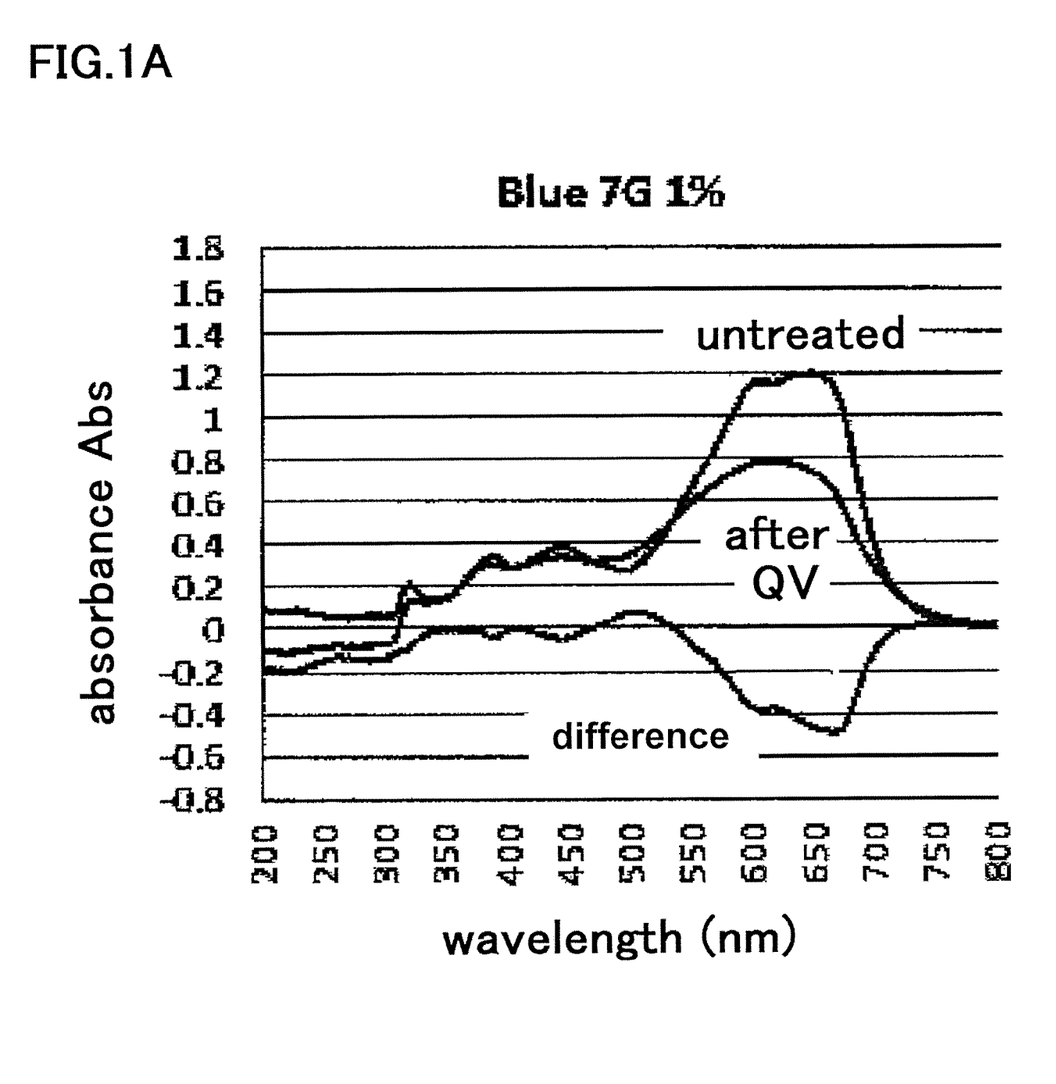
FIG. 1A shows reflection spectra of the surface of artificial leather dyed with C.I. Basic Blue 3 (Blue 7G) at 1% owf, showing spectra before and after a QUV accelerated weathering test, and a difference spectrum for each of the artificial leathers.
Figure 1B:
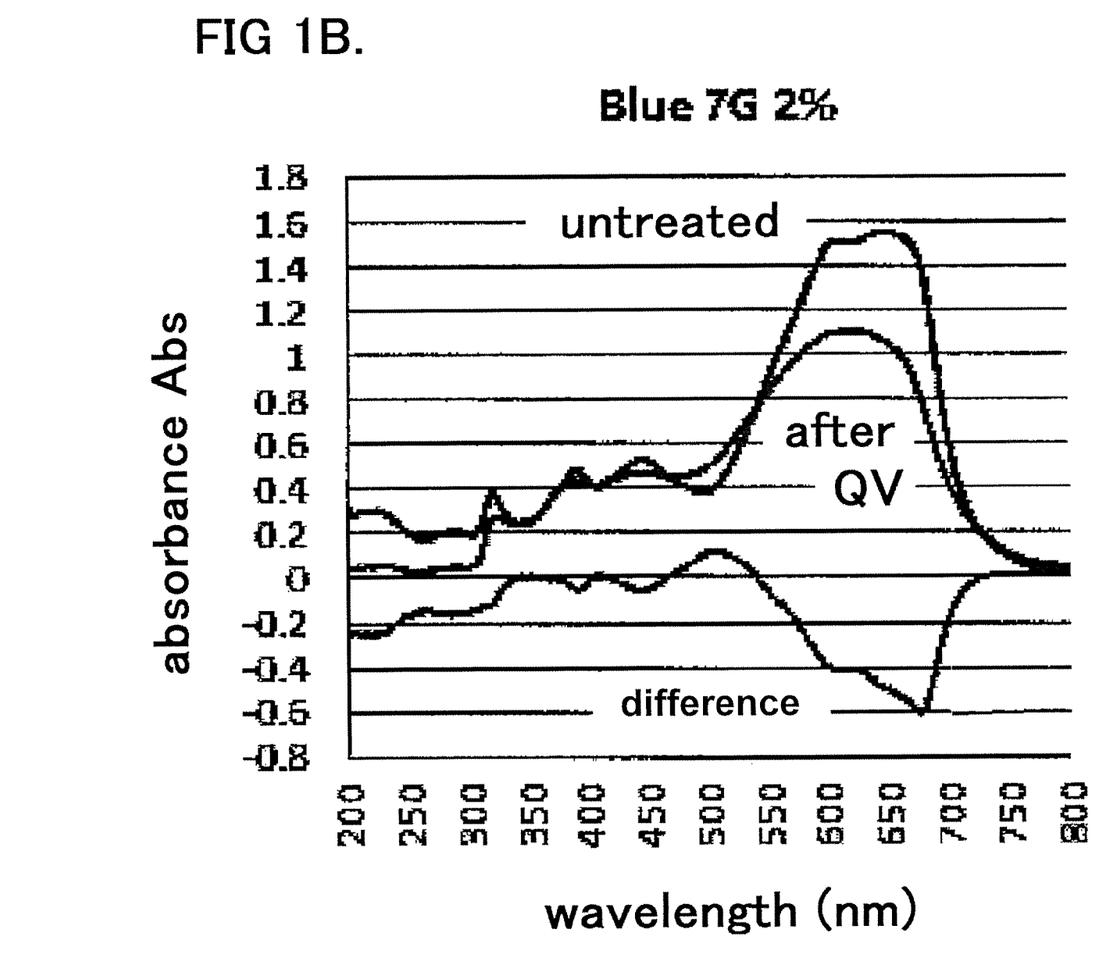
FIG. 1B shows reflection spectra of the surface of artificial leather dyed with C.I. Basic Blue 3 (Blue 7G) at 2% owf, showing spectra before and after a QUV accelerated weathering test, and a difference spectrum for each of the artificial leathers.
Figure 1C:
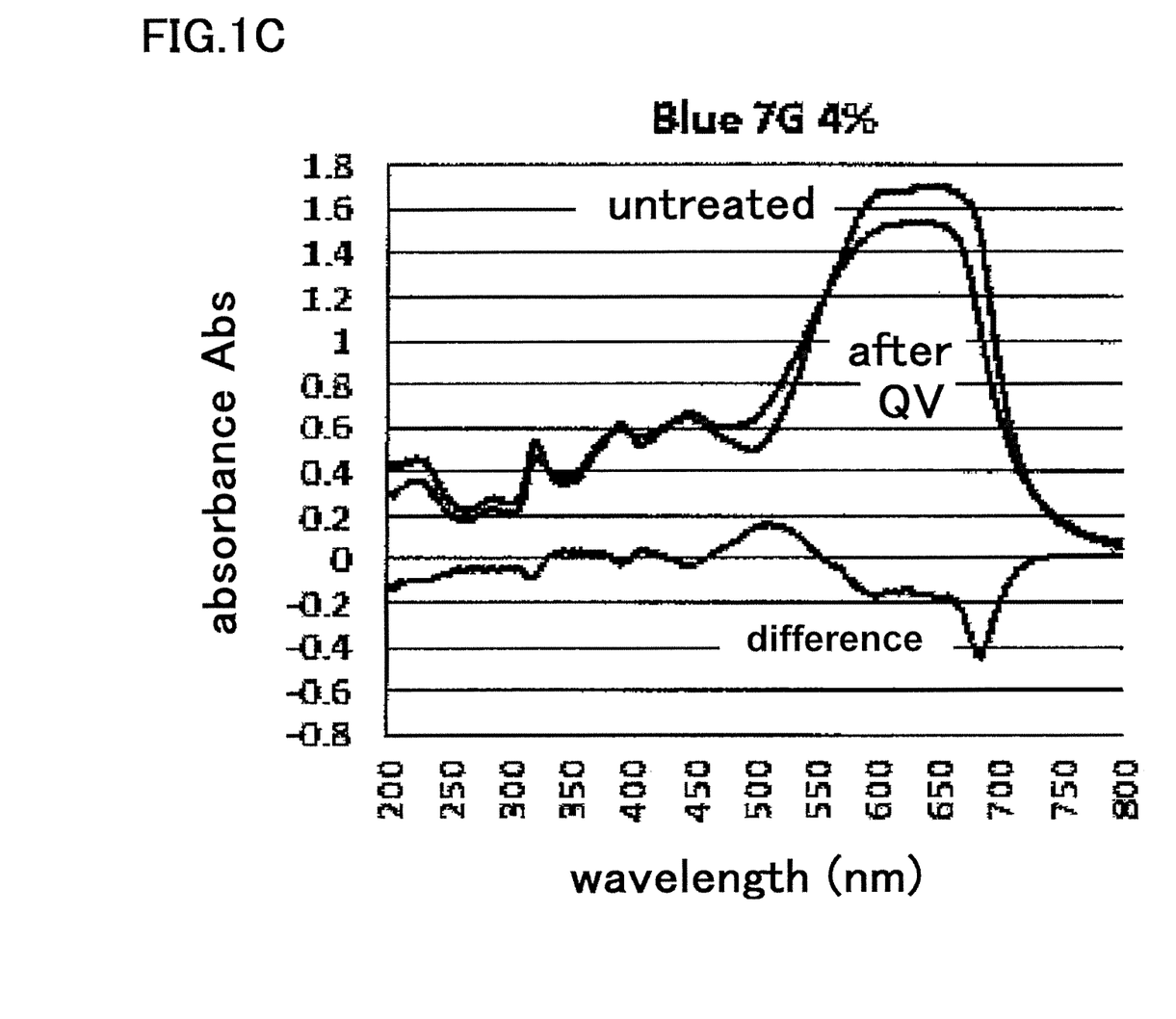
FIG. 1C shows reflection spectra of the surface of artificial leather dyed with C.I. Basic Blue 3 (Blue 7G) at 4% owf, showing spectra before and after a QUV accelerated weathering test, and a difference spectrum for each of the artificial leathers.
Figure 1D:
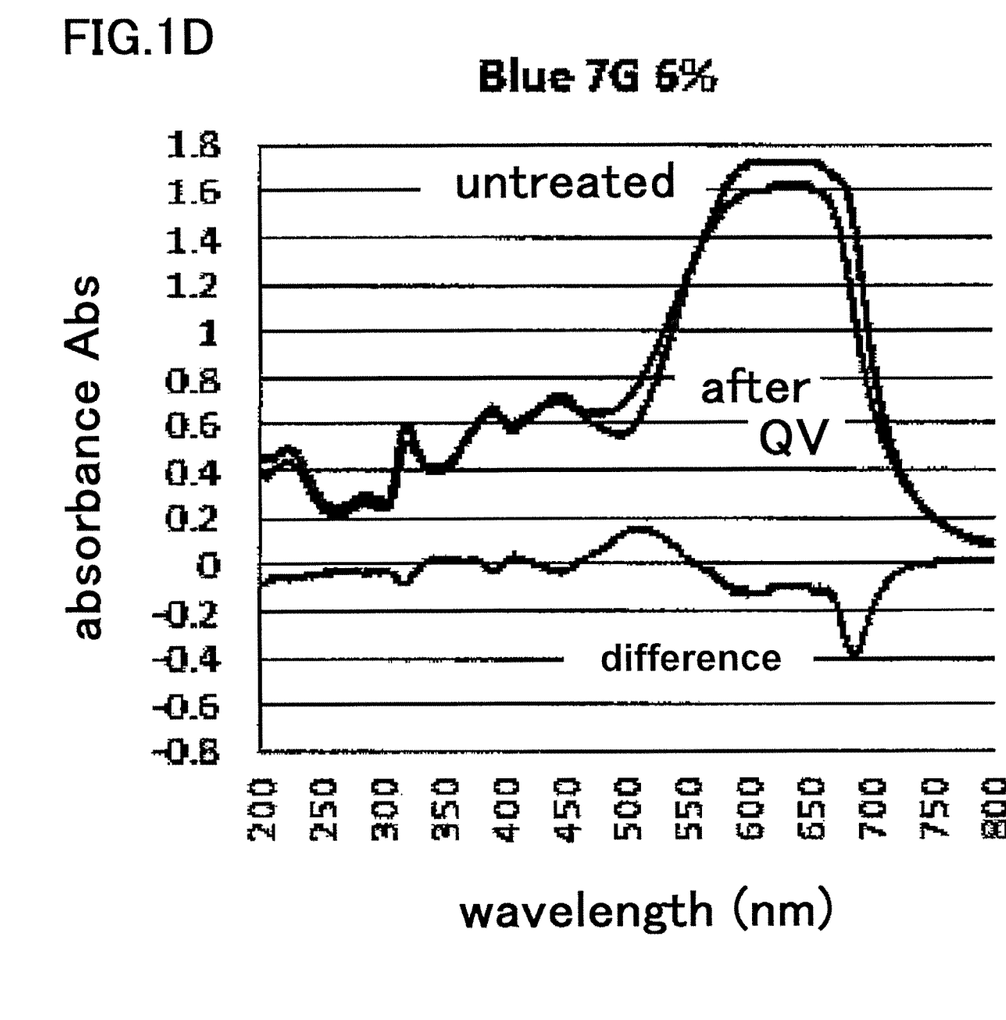
FIG. 1D shows reflection spectra of the surface of artificial leather dyed with C.I. Basic Blue 3 (Blue 7G) at 6% owf, showing spectra before and after a QUV accelerated weathering test, and a difference spectrum for each of the artificial leathers.
Figure 2A:
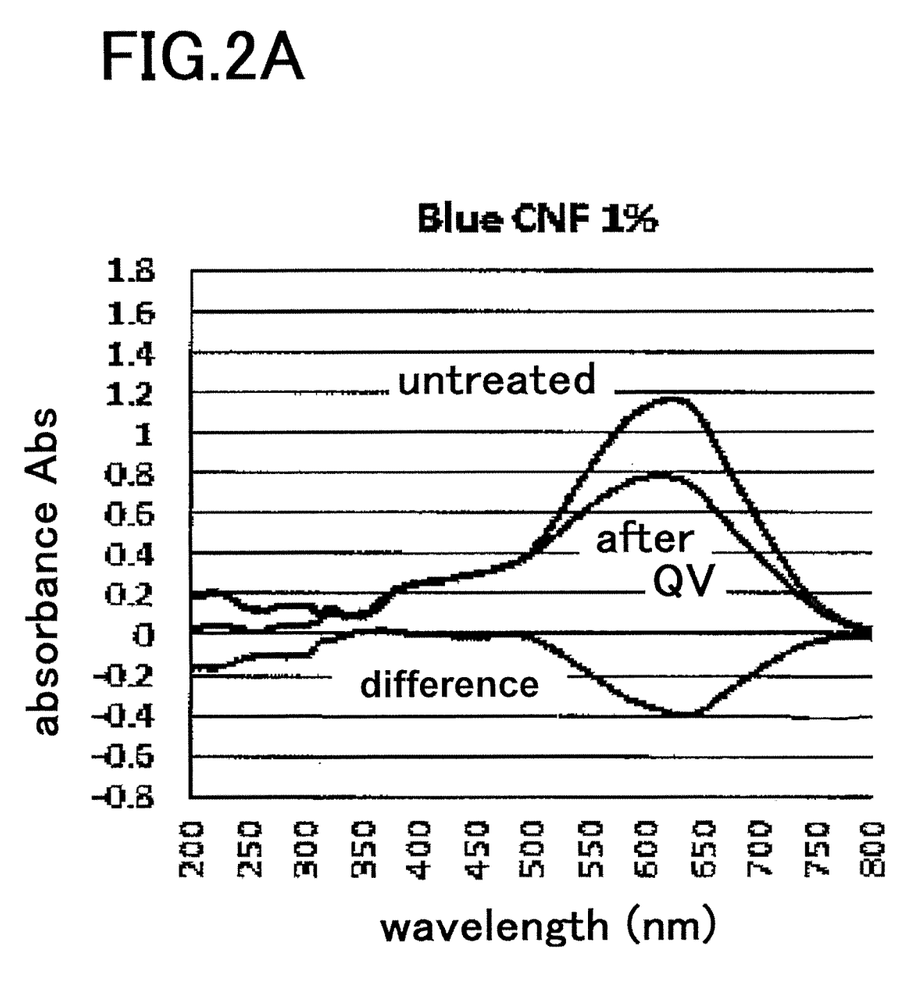
FIG. 2A shows the reflection spectra of the surface of artificial leather dyed with Blue CNF including C.I. Basic Blue 159/C.I. Basic Blue 75=7/3 at 1% owf, showing spectra before and after a QUV accelerated weathering test, and a difference spectrum for each of the artificial leathers.
Figure 2B:
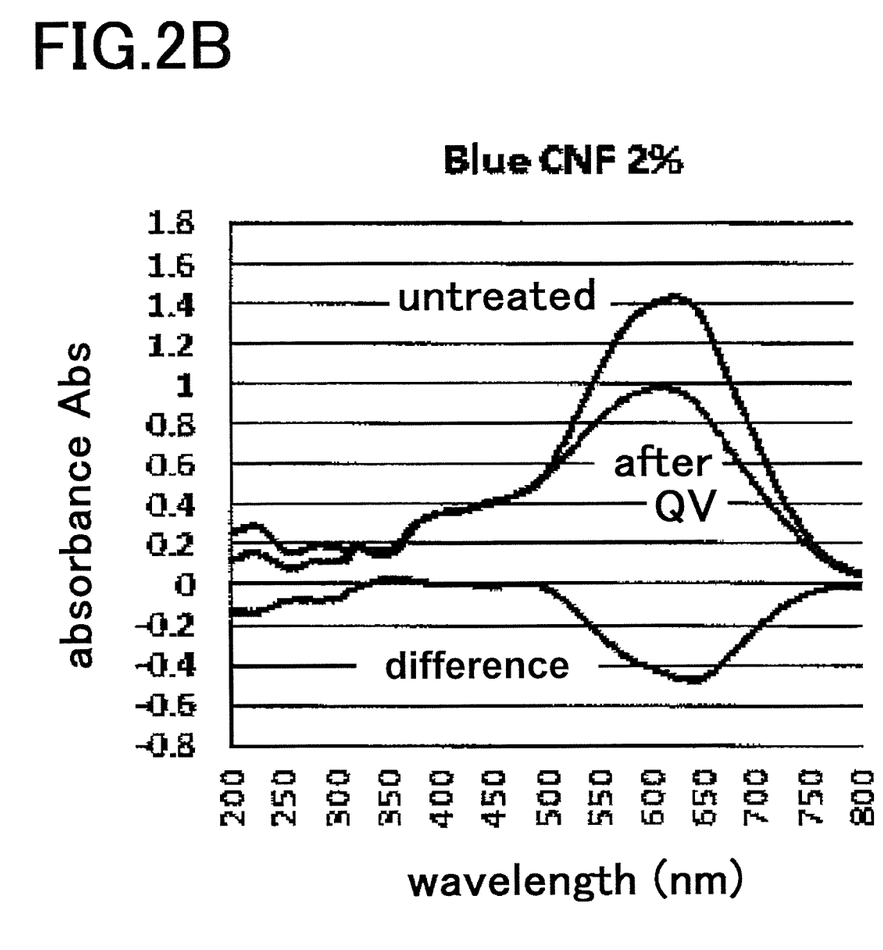
FIG. 2B shows the reflection spectra of the surface of artificial leather dyed with Blue CNF including C.I. Basic Blue 159/C.I. Basic Blue 75=7/3 at 2% owf, showing spectra before and after a QUV accelerated weathering test, and a difference spectrum for each of the artificial leathers.
Figure 2C:
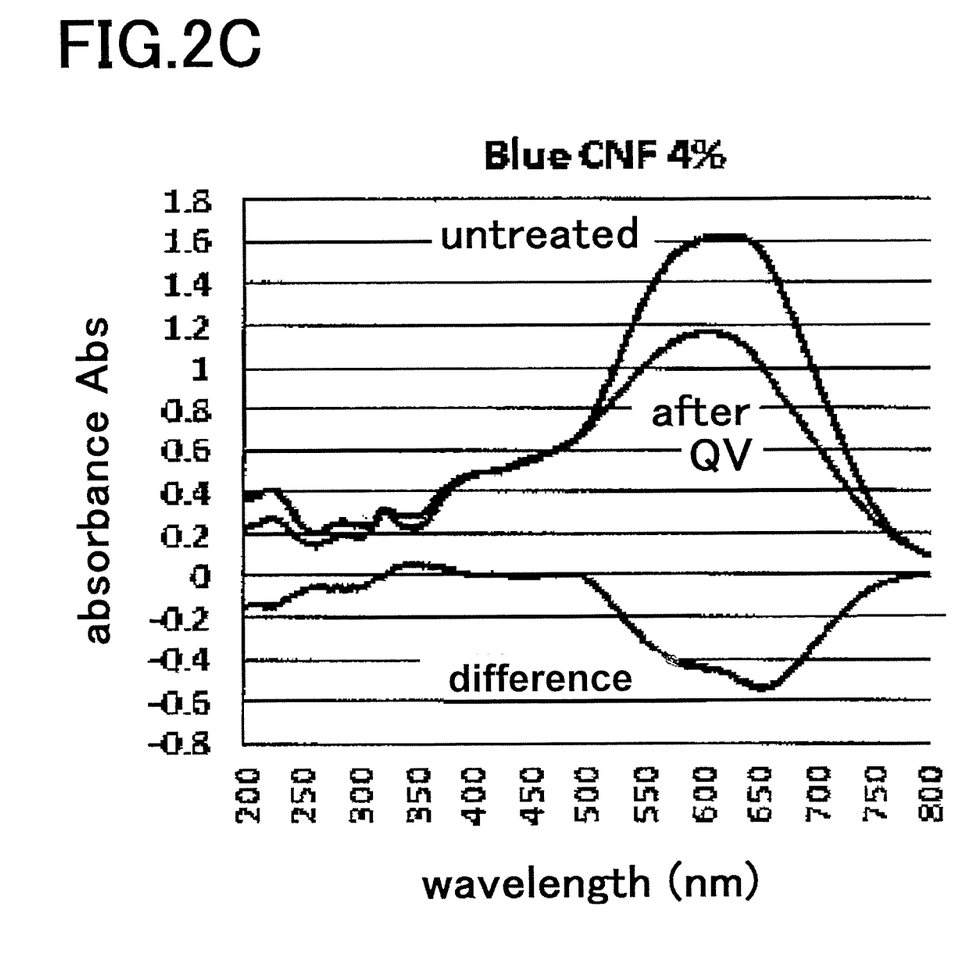
FIG. 2C shows the reflection spectra of the surface of artificial leather dyed with Blue CNF including C.I. Basic Blue 159/C.I. Basic Blue 75=7/3 at 2% owf, showing spectra before and after a QUV accelerated weathering test, and a difference spectrum for each of the artificial leathers.
Figure 2D:
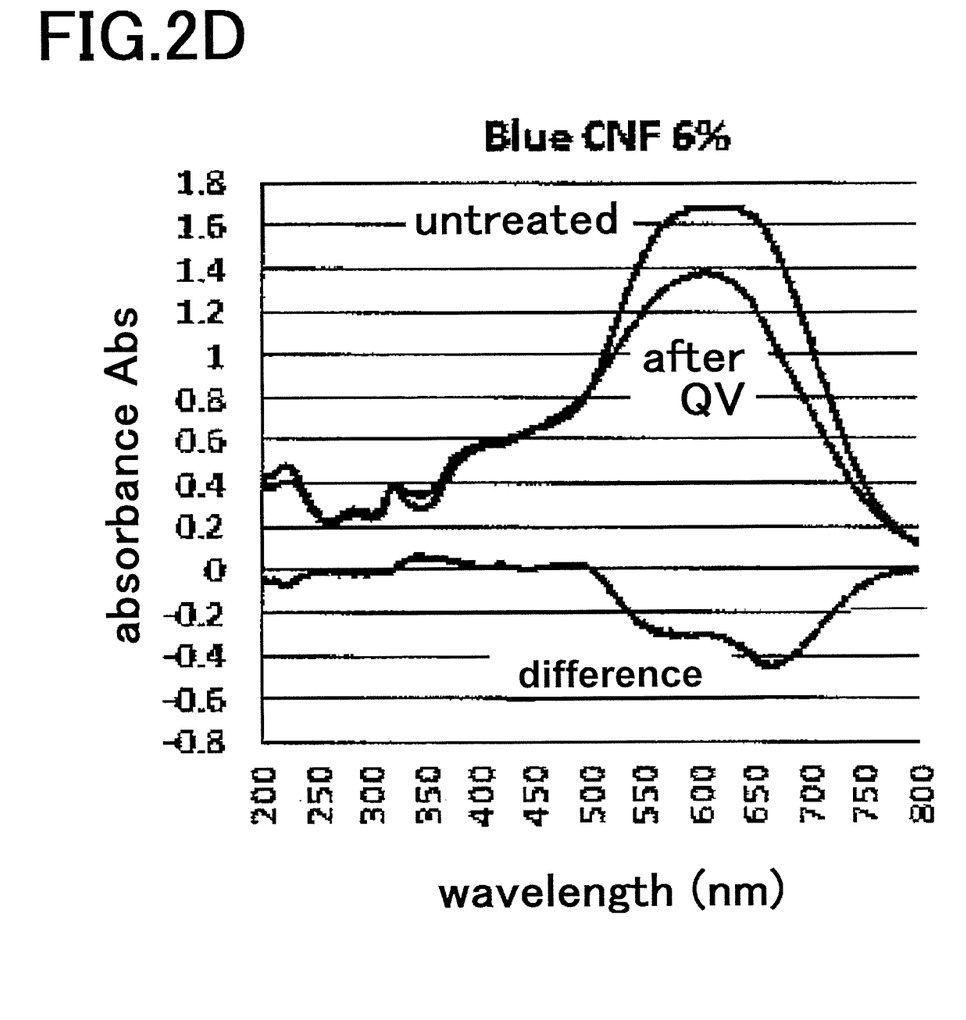
FIG. 2D shows the reflection spectra of the surface of artificial leather dyed with Blue CNF including C.I. Basic Blue 159/C.I. Basic Blue 75=7/3 at 2% owf, showing spectra before and after a QUV accelerated weathering test, and a difference spectrum for each of the artificial leathers.

The results of analyzing this phenomenon by spectroscopic measurement are shown in FIGS. 1A to 1D and 2A to 2D. FIGS. 1A to 1D respectively show the reflection spectra of the surfaces of suede-like artificial leathers dyed with C.I. Basic Blue 3 (Blue 7G) at 1%, 2%, 4%, or 6% owf, obtained in Comparative Examples 3 to 6 described below. FIGS. 2A to 2D respectively show the reflection spectra of the surfaces of suede-like artificial leathers dyed with Blue CNF including C.I. Basic Blue 159/C.I. Basic Blue 75=7/3 at 1%, 2%, 4%, 6% owf, obtained in Comparative Examples 7 to 10 described below. Spectra before and after the QUV accelerated weathering test, and a difference spectrum are shown for each of the suede-like artificial leathers.

Referring to FIGS. 2A to 2D respectively, the suede-like artificial leathers dyed with C.I. Basic Blue 159/C.I. Basic Blue 75=7/3, which is a commonly used blue cationic dye, exhibited no change in the peak near 450 to 500 nm, which represent blue to green, after the QUV accelerated weathering test, and exhibited a decrease in the absorbance and a difference spectrum with a negative value at 500 to 750 nm, which represent green to red, indicating that the suede-like artificial leathers were lightened in color. This is more notably indicated for the dark-color suede-like artificial leather with 6% owf, which had a higher dye exhaustion percentage than the suede-like artificial leather with 1% owf.

On the other hand, referring to FIGS. 1A to 1D respectively, the suede-like artificial leathers dyed with C.I. Basic Blue 3 exhibited a decrease in the absorbance at 550 to 700 nm, which represent yellow to red, after the QUV accelerated weathering test, but exhibited an increase in the absorbance and a difference spectrum with a positive value near 450 to 550 nm, which represent blue to green, indicating that a new blue color has been produced. This is also more notably indicated for the dark-color suede-like artificial leather with 6% owf of FIG. 1D, which had a higher dye exhaustion percentage than that of the suede-like artificial leather with 1% owf of FIG. 1A.

With the above-described phenomenon, in the case of adding C.I. Basic Blue 3 when color matching is performed using a plurality of blue cationic dyes, C.I. Basic Blue 3 develops a new blue color upon receiving light, and it is therefore possible to achieve the effect of suppressing the fading as a whole.

The ratio of C.I. Basic Blue 3 is preferably 30 to 70 mass %, more preferably 35 to 65 mass %, relative to the total mass of C.I. Basic Blue 3 and at least one blue cationic dye other than C.I. Basic Blue 3. When the content ratio of C.I. Basic Blue 3 is too high, it is difficult to develop a bright blue color because C.I. Basic Blue 3 is less likely to develop a bright blue color. When the content ratio of C.I. Basic Blue 3 is too low, the above-described effect cannot to be sufficiently achieved.

The dyeing method is not particularly limited, and examples thereof include methods in which dyeing is performed using a dyeing machine such as a jet dyeing machine, a beam dyeing machine, or a jigger. As for the conditions for dyeing processing, dyeing may be performed at a high pressure, but it is preferable to perform dyeing at normal pressure in that the environmental load is low, and the dyeing cost can be reduced, because the cationic dyeable fibers can be dyed at normal pressure. In the case of performing dyeing at normal pressure, the dyeing temperature is preferably 60 to 100° C., more preferably 80 to 100° C. During dyeing, a dyeing assistant such as acetic acid or mirabilite may be used. In order to increase the light resistance, a light resisting agent may be used as needed. Specific examples of the light resisting agent include a benzotriazole-based light resisting agent, a triazine-based light resisting agent, and a benzophenone-based light resisting agent. These may be used alone or in a combination of two or more.

In the case of performing dyeing with a cationic dye, the concentration of the cationic dye in a dye liquid is in the range of preferably 0.5 to 20% owf, more preferably 1.0 to 15% owf, relative to the cationic dyeable fibers, because the dye can sufficiently develop a dark color, and the migration of the dye can be inhibited. When the concentration of the cationic dye in the dye liquid is too high, an excessively large amount of the cationic dye is exhausted without being fixed to the dye sites, so that the dye tends to migrate to other materials. When the concentration of the cationic dye is too low, it tends to be difficult for the dye to develop a dark color.

It is preferable that the leather-like sheet or fiber structure dyed with a cationic dye is subjected to a washing treatment in a hot water bath containing an anionic surfactant, thereby removing a cationic dye having a low bonding strength. With such a washing treatment, the cationic dye having a low bonding strength is sufficiently removed, thus inhibiting the cationic dye from migrating to other materials. Specific examples of the anionic surfactant include Soluzine R manufactured by NISSEI KASEI CO., LTD., SENKANOL A-900 manufactured by SENKA Corp., and Meisanol KHM manufactured by Meisei Chemical Works, Ltd.

The washing treatment in the hot water bath containing an anionic surfactant is performed in a hot water bath at preferably 50 to 100° C., more preferably 60 to 80° C. The washing time is preferably about 10 to 30 minutes, more preferably about 15 to 20 minutes. Also, the washing may be repeated once or more, preferably twice or more.

In the fiber structure including the dyed cationic dyeable fibers, it is preferable that the total exhaustion percentage of C.I. Basic Blue 3 and the at least one blue cationic dye other than C.I. Basic Blue 3 is preferably 0.5 mass % or more, more preferably 1.0 mass % or more, particularly preferably 1.5 mass % or more, and that the total exhaustion percentage of the cationic dyes is preferably 3.0 mass % or more, more preferably 4.0 mass % or more, particularly preferably 5.0 mass % or more, because a dark color such as a color having preferably an L* value of ≤35, more preferably an L* value of ≤30 can be developed, thus achieving a remarkable effect in improving the lightfastness.

In this manner, a leather-like sheet or a fiber structure dyed with a blue cationic dye is obtained. The leather-like sheet or fiber structure dyed with a blue cationic dye according to the present embodiment has a high lightfastness even when it is dyed in a dark color.

Because an excellent lightfastness is achieved, it is preferable that the dyed leather-like sheet or fiber structure has a grade, determined in a G37 UV Color Change mode of Datacolor after an elapse of 24 hours in a weathering test using an accelerated lightfastness tester QUV/se (45° C., illuminance: 0.78 W/m$^2$) manufactured by Q-PANEL Co., of 2.5 or more.

As for color development, the dyed leather-like sheet or fiber structure is colored in a dark color such that the lightness L* is preferably 35 or less, more preferably 30 or less in the color coordinate space (L*a*b* color space), and it is therefore possible to achieve a more remarkable effect.

As a second embodiment, the discoloration of the cationic dye under moist and hot conditions can be suppressed by applying an anionic polyhydric phenol derivative to a leather-like sheet or a fiber structure dyed with an azo-based blue cationic dye. Examples of the anionic polyhydric phenol derivative include a polyhydric phenol derivative used as a moisture-fastness improving agent for nylon fibers dyed with an acid dye, and more specific examples thereof include Dimafix, which is a formalin condensate of a sulfonated compound of an aromatic derivative, manufactured by Meisei Chemical Works, Ltd. The dyeing amount of the polyhydric phenol derivative is not particularly limited, and is preferably about 70 to 200% relative to the amount of the dye attached, since the moist heat discoloration resistance can be sufficiently improved.

By applying the anionic polyhydric phenol derivative to the leather-like sheet or fiber structure dyed with an azo-based blue cationic dye, it is possible to achieve a moist heat discoloration resistance that provides a color difference (ΔE), determined when treated for 48 hours under moist and hot conditions of 80° C. and a moisture of 90%, of preferably ΔE≤2, more preferably ΔE≤1.

As for color development, the leather-like sheet or fiber structure is colored in a dark color that has a lightness L* of preferably 35 or less, more preferably 30 or less in the color coordinate space (L*a*b* color space), and it is therefore possible to achieve a more remarkable effect.

EXAMPLES

Hereinafter, the present invention will be described more specifically by way of examples. It should be appreciated that the scope of the present invention is by no means limited by the examples. First, various dyes used in the present examples are described below.

(Dyes)
Blue 7G: C.I. Basic Blue 3 (oxazine-based blue cationic dye) (manufactured by NISSEI KASEI CO., LTD.)
Blue CNF: C.I. Basic Blue 159/C.I. Basic Blue 75=7/3 (azo-based blue cationic dye/oxazine-based blue cationic dye) (manufactured by NISSEI KASEI CO., LTD.)
Red GL: Basic Red 29 (azo-based red cationic dye) (manufactured by NISSEI KASEI CO., LTD.)
Yellow GL: Basic Yellow 28 (azomethine-based yellow cationic dye) (manufactured by NISSEI KASEI CO., LTD.)

Example 1

A fiber structure obtained by three-dimensionally entangling island-in-the-sea composite fibers was prepared, with the fiber structure including ethylene-modified polyvinyl alcohol (PVA) as a thermoplastic resin serving as a sea component, and polyethylene terephthalate modified with a tetrabutylphosphonium salt of sulfoisophthalic acid (cationic dyeable PET) as a thermoplastic resin serving as an island component, and the mass ratio between the sea component and the island component being sea component/island component=25/75. Note that the PVA had an ethylene unit content ratio of 8.5 mol %, a degree of polymerization of 380, and a saponification degree of 98.7 mol %. The cationic dyeable PET contained 1.7 mol % of a tetrabutylphosphonium salt unit of sulfoisophthalic acid, 5 mol % of a 1,4-cyclohexane dicarboxylic acid unit, and 5 mol % of an adipic acid unit, and had a glass transition temperature of 62° C.

Then, the fiber structure was impregnated with a polyurethane emulsion, and dried at a drying furnace at 150° C., thus applying polyurethane to the fiber structure. Then, the sea component included in the island-in-the-sea composite fibers was removed by extraction by immersing the fiber structure to which polyurethane had been applied in hot water at 95° C. for 20 minutes, and the fiber structure was dried in a drying furnace at 120° C., thus obtaining an artificial leather gray fabric including the non-woven fabric of the cationic dyeable polyester fibers with a fineness of 0.2 dtex that had been impregnated with polyurethane. The obtained artificial leather gray fabric had a mass ratio of non-woven fabric/polyurethane of 90/10. Then, the obtained artificial leather gray fabric was sliced into halves, and the surface thereof was buffed with sand paper with a grit number of 600, thus obtaining a suede-like artificial leather gray fabric. The suede-like artificial leather gray fabric had a fineness of 0.2 dtex, a polyurethane ratio of 10 mass %, a thickness of 0.78 mm, and an apparent density of 0.51 g/cm$^3$.

The suede-like artificial leather gray fabric was scalded in hot water at 80° C. for 20 minutes to relax the fabric with the hot water, and subsequently dyed using a high-pressure jet dyeing machine (circular dyeing machine from HISAKA WORKS, LTD.) under the following conditions.

| Dyeing Conditions | |
|---|---|
| Dye liquid: | |
| Blue 7G | 1.0% o.w.f. |
| Blue CNF | 1.0% o.w.f. |
| Red GL | 1.7% o.w.f. |
| Yellow GL | 0.6% o.w.f. |
| 90% acetic acid (dyeing assistant) | 1 g/L |
| Light resisting agent | benzotriazole-based |
| Dyeing temperature: | 120° C. |
| Dyeing time: | 40 minutes |
| Bath ratio: | 1:20 |

Then, the suede-like artificial leather gray fabric was soaped in the same dyeing bath at 70° C. using a hot water bath containing 2 g/L of Soluzine R as an anionic surfactant. Then, after the soaping, the gray fabric was dried, thereby obtaining a suede-like artificial leather dyed in a navy blue. The dye exhaustion percentage for the non-woven fabric of the cationic dyeable polyester fibers was 97.2 mass %. Then, the suede-like artificial leather was evaluated as follows.

[Discoloration Evaluation by QUV Test]

For the suede-like artificial leather before being subjected to the test, the coordinate values of the L*a*b* color system on the surface were determined using a spectrophotometer (CM-3700 manufactured by Minolta). The value was an average of the values for three points evenly selected from average positions of the test piece. Then, the suede-like artificial leather was irradiated with UV for 24 hours using a weathering test with an accelerated lightfastness tester QUV/se manufactured by Q-PANEL (45° C., illuminance: 0.78 W/m$^2$). Then, the coordinate values of the L*a*b* color system on the surface of the suede-like artificial leather taken out after the test, the color difference ΔE, and the values of Δa, Δb, and ΔL before and after the test were determined. Furthermore, the grade of fading after the accelerated weathering test was determined using the G37 UV Color Change mode of a Datacolor.

The results are shown in Table 1.

TABLE 1

| | Example No. | 1 | | 2 | | 3 | | 4 | | 5 | | 6 | |
|---|---|---|---|---|---|---|---|---|---|---|---|---|---|
| Dye (owf %) | Blue 7G (C.I. Basic Blue 3) | 1.00 | | 1.00 | | 0.43 | | 0.43 | | 0.50 | | 1.50 | |
| | Blue CNF | 1.00 | | 1.00 | | 0.43 | | 0.43 | | 1.00 | | 1.00 | |
| | Red GL | 1.70 | | 1.70 | | 4.60 | | 4.6 | | 1.70 | | 1.70 | |
| | Yellow GL | 0.60 | | 0.60 | | 0.50 | | 0.5 | | 0.60 | | 0.60 | |
| Ratio of C.I. Basic Blue 3 in blue cationic dye (%) | | 50 | | 50 | | 50 | | 50 | | 32 | | 60 | |
| Color tone observed by visual inspection | | Navy blue | | Navy blue | | Reddish brown | | Reddish brown | | Navy blue | | Navy blue | |
| Changes during QUV test | | Before | After | Before | After | Before | After | Before | After | Before | After | Before | After |
| *L | Dark 0 ↔ 100 Light | 24.8 | 27.2 | 24.4 | 26.0 | 26.7 | 29.1 | 26.8 | 29.0 | 26.3 | 29.5 | 24.2 | 25.7 |
| *a | Red + ↔ − Green | 2.2 | 5.5 | 2.2 | 4.7 | 21.9 | 25.3 | 21.9 | 24.8 | 1.8 | 5.6 | 2.6 | 5.4 |
| *b | Yellow + ↔ − blue | −13.2 | −22.3 | −13.2 | −12.8 | −1.9 | 0.7 | −2.2 | −1.4 | −13.8 | −19.1 | −15.1 | −24.4 |
| Color difference ΔE | | 10.0 | | 3.0 | | 5.0 | | 3.8 | | 7.3 | | 9.8 | |
| ΔL | | 2.4 | | 1.6 | | 2.4 | | 2.2 | | 3.2 | | 1.5 | |
| Δa | | 3.4 | | 2.5 | | 3.4 | | 3.0 | | 3.8 | | 2.8 | |
| Δb | | −9.1 | | 0.4 | | 2.6 | | 0.8 | | −5.3 | | −9.3 | |
| QUV evaluation (grade) | | 2.7 | | 3.1 | | 2.6 | | 2.9 | | 2.5 | | 2.9 | |
| Light resisting agent | | Benzotriazole-based | | Benzotriazole-based and triazine-based in combination | | Benzotriazole-based | | Benzotriazole-based and triazine-based in combination | | Benzotriazole-based | | Benzotriazole-based | |

Examples 2 to 6, Comparative Examples 1 to 10

Dyed suede-like artificial leathers were obtained and evaluated in the same manner as in Example 1 except that the dye compositions shown in Table 1 were used in place of the dye composition used in Example 1. The results are shown in Tables 1 and 2.

Basic Blue 3 and Blue CNF including C.I. Basic Blue 159/C.I. Basic Blue 75=7/3. On the other hand, the values were +4.0 and +3.4 in Comparative Examples 1 and 2, respectively, in which the suede-like artificial leathers were dyed in a navy blue color with a blue cationic dye, without including C.I. Basic Blue 3. The change in the lightness difference was clearly smaller in Examples 1 and 2 in which

TABLE 2

|  |  | Comparative Example No. | | | | | | | | | | | | | |
|---|---|---|---|---|---|---|---|---|---|---|---|---|---|---|
|  |  | Com. Ex. 1 | | Com. Ex. 2 | | Com. Ex. 3 | | Com. Ex. 4 | | Com. Ex. 5 | | Com. Ex. 6 | | Com. Ex. 7 | |
| Dye (owf %) | Blue 7G (C.I. Basic Blue 3) | — | | — | | 1 | | 2 | | 4 | | 6 | | — | |
|  | Blue CNF | 1.70 | | 1.70 | | — | | — | | — | | — | | 1 | |
|  | Red GL | 0.90 | | 0.90 | | — | | — | | 0.86 | | — | | — | |
|  | Yellow GL | 0.50 | | 0.50 | | — | | — | | — | | — | | — | |
| Ratio of C.I. Basic Blue 3 in blue cationic dye (%) |  | 0 | | 0 | | 100 | | 100 | | 100 | | 100 | | 0 | |
| Color tone observed by visual inspection |  | Navy blue | | Navy blue | | Greenish blue | | Greenish blue | | Greenish blue | | Greenish blue | | Blue | |
| Changes during QUV test |  | Before | After | Before | After | Before | After | Before | After | Before | After | Before | After | Before | After |
| *L | Dark 0 ↔ 100 Light | 28.6 | 32.6 | 28.9 | 32.3 | 54.5 | 56.6 | 45.8 | 46.0 | 38.4 | 35.7 | 35.8 | 32.5 | 48.3 | 54.7 |
| *a | Red + ↔ − Green | 1.5 | 6.0 | 1.4 | 5.1 | −31.5 | −12.7 | −32.3 | −13.0 | −29.2 | −14.3 | −27.2 | −13.6 | −9.3 | −4.6 |
| *b | Yellow + ↔ − blue | −14.0 | −11.1 | −14.2 | −12.1 | −24.4 | −22.3 | −25.7 | −26.3 | −25.5 | −29.2 | −25.0 | −29.0 | −38.7 | −28.0 |
| Color difference ΔE |  | 6.7 | | 5.4 | | 19.0 | | 19.3 | | 15.6 | | 14.6 | | 13.3 | |
| ΔL |  | 4.0 | | 3.4 | | 2.1 | | 0.2 | | −2.7 | | −3.3 | | 6.5 | |
| Δa |  | 4.5 | | 3.6 | | 18.7 | | 19.3 | | 14.9 | | 13.6 | | 4.7 | |
| Δb |  | 3.0 | | 2.1 | | 2.1 | | −0.6 | | −3.7 | | −4.0 | | 10.7 | |
| QUV evaluation (grade) |  | 1.9 | | 2.3 | | 0.8 | | 0.8 | | 1.0 | | 1.0 | | 1.4 | |
| Light resisting agent |  | Benzotriazole-based | | Benzotriazole-based and triazine-based in combination | | None | | None | | None | | None | | None | |

|  |  | Comparative Example No. | | | | | |
|---|---|---|---|---|---|---|---|
|  |  | Com. Ex. 8 | | Com. Ex. 9 | | Com. Ex. 10 | |
| Dye (owf %) | Blue 7G (C.I. Basic Blue 3) | — | | — | | — | |
|  | Blue CNF | 2 | | 4 | | 6 | |
|  | Red GL | — | | — | | — | |
|  | Yellow GL | — | | — | | — | |
| Ratio of C.I. Basic Blue 3 in blue cationic dye (%) |  | 0 | | 0 | | 0 | |
| Color tone observed by visual inspection |  | Blue | | Blue | | Blue | |
| Changes during QUV test |  | Before | After | Before | After | Before | After |
| *L | Dark 0 ↔ 100 Light | 40.1 | 46.9 | 31.9 | 38.6 | 27.9 | 32.2 |
| *a | Red + ↔ − Green | −6.2 | −2.7 | −1.1 | −0.2 | 2.2 | 1.6 |
| *b | Yellow + ↔ − blue | −40.7 | −29.6 | −40.4 | −29.6 | −39.2 | −30.9 |
| Color difference ΔE |  | 13.5 | | 12.8 | | 9.4 | |
| ΔL |  | 6.8 | | 6.7 | | 4.3 | |
| Δa |  | 3.5 | | 0.9 | | −0.6 | |
| Δb |  | 11.2 | | 10.8 | | 8.3 | |
| QUV evaluation (grade) |  | 1.5 | | 1.5 | | 2.0 | |
| Light resisting agent |  | None | | None | | None | |

Example 1 and Comparative Example 1 are suede-like artificial leathers dyed in navy blue colors having similar color tones, and so are Example 2 and Comparative Example 2. Examples 1 and 2 were dyed under the same dyeing conditions except that different light resisting agents were used, and so were Comparative Examples 1 and 2. In comparing between the dyed suede-like artificial leathers of Example 1 and Comparative Example 1, and between the dyed suede-like artificial leathers of Example 2 and Comparative Example 2, comparisons of the values of ΔL, which is the difference between the value of L* before the QUV test and the value of L* after the QUV test, showed that the values were +2.4 and +1.6 in Examples 1 and 2, respectively, in which the suede-like artificial leathers were dyed in a navy blue color with a blue cationic dye that included C.I. Basic Blue 3 was added. In addition, the values of Δb in Examples 1 and 2 are negative or smaller as compared with those in Comparative Examples 1 and 2, demonstrating that the suede-like artificial leathers of Examples 1 and 2 were bluish or slightly yellowish.

Comparative Examples 3 to 6 are suede-like artificial leathers dyed with only C.I. Basic Blue 3 at 1%, 2%, 4%, or 6% owf, and Comparative Examples 7 to 10 are suede-like artificial leathers dyed with Blue CNF including C.I. Basic Blue 159/C.I. Basic Blue 75=7/3 at 1%, 2%, 4%, or 6% owf. For the suede-like artificial leathers of Comparative Examples 3 to 6 dyed with C.I. Basic Blue 3, it can be seen that, as the concentration of the dye increases, ΔL becomes negative, that is, the darkness increases, and the color changes in the darker direction. For the dyed suede-like artificial leathers of Comparative Examples 3 to 6, it can be seen that Δb also takes a negative value, and the color becomes more bluish.

On the other hand, for the suede-like artificial leathers of Comparative Examples 7 to 10 dyed with Blue CNF including C.I. Basic Blue 159/C.I. Basic Blue 75=7/3, it can be seen that, regardless of the dye concentration, ΔL increases and the lightness increases, so that the color is faded. It can also be seen that Δb takes a positive value, and the color becomes more yellowish.

As described above, FIGS. 1A to 1D respectively show the reflection spectra of the surfaces of suede-like artificial leathers, obtained in Comparative Examples 3 to 6, dyed with C.I. Basic Blue 3 at 1%, 2%, 4%, or 6% owf. FIGS. 2A to 2D respectively show the reflection spectra of the surfaces of suede-like artificial leathers, obtained in Comparative Examples 7 to 10, dyed with Blue CNF including C.I. Basic Blue 159/C.I. Basic Blue 75=7/3 at 1%, 2%, 4%, or 6% owf.

Referring to FIGS. 2A to 2D respectively, the suede-like artificial leathers, obtained in Comparative Examples 7 to 10, dyed with Blue CNF including C.I. Basic Blue 159/C.I. Basic Blue 75=7/3 exhibited no change in the peak near 450 to 500 nm, which represent blue to green, after the QUV accelerated weathering test, and exhibited a decrease in the absorbance and a difference spectrum of a negative value at 500 to 750 nm, which represent green to red, indicating that the suede-like artificial leathers were lightened in color. On the other hand, referring to FIGS. 1A to 1D respectively, the suede-like artificial leathers, obtained in Comparative Examples 3 to 6, dyed with C.I. Basic Blue 3 exhibited a decrease in the absorbance at 500 to 700 nm, which represent green to red, after the QUV accelerated weathering test, but exhibited an increase in the absorbance and a difference spectrum of a positive value near 450 to 550 nm, which represent blue to green, indicating that a new blue color had been produced.

Example 7

A non-woven fabric of island-in-the-sea composite fibers including cationic dyeable polyester fibers as the sea component was impregnated with a self-emulsified aqueous polyurethane resin, thereafter the sea component was extracted, and the non-woven fabric was buffed, thus obtaining a suede-like artificial leather gray fabric including a fiber structure, which was an ultrafine fiber non-woven fabric having an average fineness of 0.2 dtex, a polyurethane ratio of 10 mass %, a thickness of 0.78 mm, and an apparent density 0.49 g/cm$^3$. Then, the obtained suede-like artificial leather gray fabric was dyed with a dye liquid containing cationic dyes (Nichilon Blue-GL (azo-based blue cationic dye) at 4% owf, Nichilon Golden Yellow-GL (azomethine-based) at 2% owf, and Nichlon Red-GL (azo-based) at 2% owf) under the conditions: 120° C.×40 minutes. Then, the suede-like artificial leather gray fabric was soaped twice using 2 g/L of a Soluzine R solution under the conditions: 70° C.×20 minutes, thus obtaining a suede-like artificial leather colored in a dark navy blue. Note that Nichilon Blue-GL is C.I. Basic Blue 54. Then, measurement with a differential colorimeter of the color development at that time showed that L*=24.5, a*=1.7, and b*=−9.5 in the L*a*b* color system. Note that each of the coordinate values of the L*a*b* color system of the suede-like artificial leather was determined using a spectrophotometer (CM-3700 manufactured by Minolta) as an average of the values for three points evenly selected from average positions on the surface.

Next, 6% owf of an anionic polyhydric phenol derivative (Dimafix ESH, manufactured by Meisei Chemical Works, Ltd.) was applied to the dyed suede-like artificial leather at a bath ratio 1:20, under the conditions: 80° C.×30 minutes, followed by drying. In this manner, a suede-like artificial leather to which the anionic polyhydric phenol derivative had been applied was obtained. Measurement with a differential colorimeter of the color development of the suede-like artificial leather to which the anionic polyhydric phenol derivative had been applied showed that L*=24.7, a*=1.7, and b*=9.4.

Then, the suede-like artificial leather to which the anionic polyhydric phenol derivative had been applied was allowed to stand for 48 hours under moist and hot conditions of 80° C.×90%, followed by air-drying. Then, the color development after such a heat moisture treatment was measured with a differential colorimeter. The result showed that L*=25.2, *a=2.1, and b*=−8.9. At this time, the color difference from the color before the heat moisture treatment was ΔE=0.8, indicating a high moist heat discoloration resistance.

Example 8

A suede-like artificial leather to which an anionic polyhydric phenol derivative had been applied was obtained in the same manner as in Example 7 except that the anionic polyhydric phenol derivative had been applied at 12% owf instead of 6% owf. Measurement with a differential colorimeter of the color of the suede-like artificial leather to which a anionic polyhydric phenol derivative had been applied showed that L=25.9, a=0.97, and b=9.4. Then, as in the case of Example 7, the suede-like artificial leather to which the anionic polyhydric phenol derivative had been applied was allowed to stand for 48 hours under moist and hot conditions of 80° C.×90%, followed by air-drying. Then, measurement with a differential colorimeter of the suede-like artificial leather showed that L*=25.7, a*=1.6, and b*=−9.0, and the color difference from the color before the heat moisture treatment was ΔE=0.8, indicating a high moist heat discoloration resistance.

Example 9

A suede-like artificial leather to which an anionic polyhydric phenol derivative had been applied was obtained in the same manner as in Example 7 except that the anionic polyhydric phenol derivative was applied at 3% owf instead of 6% owf. Measurement with a differential colorimeter of the suede-like artificial leather to which the anionic polyhydric phenol derivative had been applied showed that L*=23.8, a=1.8, and b*=9.3. Then, as in the case of Example 7, the suede-like artificial leather to which the anionic polyhydric phenol derivative had been applied was allowed to stand for 48 hours under moist and hot conditions of 80° C.×90%, followed by air-drying. Measurement with a differential colorimeter of the suede-like artificial leather showed that L*=24.9, a*=2.4, and b*=−8.7, and the color difference from the color before the heat moisture treatment was ΔE=1.4, indicating a slightly high moist heat discoloration resistance.

Comparative Example 11

Measurement with a differential colorimeter of a suede-like artificial leather obtained in the same manner as in Example 7 except that the step of applying the anionic polyhydric phenol derivative was omitted showed that L*=25.9, a*=0.97, and b*=9.4. Then, as in the case of Example 7, the suede-like artificial leather was allowed to stand for 48 hours under moist and hot conditions of 80° C.×90%, followed by air-drying. Measurement with a differential colorimeter of the color of the suede-like artificial leather showed that L*=24.6, a*=3.6, and b*=−7.3, and the color difference from the color before the heat moisture treatment was ΔE=2.9, indicating a low moist heat discoloration resistance.

INDUSTRIAL APPLICABILITY

A leather-like sheet or a fiber structure that is obtained according to the present invention can be suitably used as a dyed material in applications such as shoes, molded articles, and clothing.

The invention claimed is:

1. A leather-like sheet, comprising:
    a fiber structure dyed with a dye composition including C.I. Basic Blue 3, which is an oxazine-based blue cationic dye, and at least one blue cationic dye other than C.I. Basic Blue 3, including an azo-based blue cationic dye; and
    an elastic polymer contained in internal voids of the fiber structure,
    wherein the C.I. Basic Blue 3 is contained in an amount of 30 to 70 mass % relative to a total amount of C.I. Basic Blue and the at least one blue cationic dye other than C.I. Basic Blue 3, including the azo-based blue cationic dye, and,
    the leather-like sheet has a lightness L* of 35 or less in a color coordinate space (L*a*b* color space).

2. The leather-like sheet according to claim 1, wherein the azo-based blue cationic dye includes at least one selected from the group consisting of C.I. Basic Blue 159 and C.I. Basic Blue 54.

3. The leather-like sheet according to claim 1, further comprising: an anionic polyhydric phenol derivative.

4. The leather-like sheet according to a claim 1, wherein the at least one blue cationic dye other than C.I. Basic Blue 3 includes an oxazine-based blue cationic dye other than C.I. Basic Blue 3.

5. The leather-like sheet according to claim 4, wherein the oxazine-based blue cationic dye other than C.I. Basic Blue 3 includes C.I. Basic Blue 75.

6. The leather-like sheet according to claim 1, wherein fibers contained in the fiber structure are ultrafine fibers of a cationic dyeable polyester having a fineness of 0.5 dtex or less.

* * * * *